(12) United States Patent
Burdock

(10) Patent No.: US 6,439,582 B1
(45) Date of Patent: Aug. 27, 2002

(54) VEHICLE SUSPENSIONS

(75) Inventor: William Burdock, West Midlands (GB)

(73) Assignee: Land Rover Group Limited, St. Helier (GB)

( * ) Notice: Subject to any disclaimer, the term of this patent is extended or adjusted under 35 U.S.C. 154(b) by 0 days.

(21) Appl. No.: 09/763,381

(22) PCT Filed: Aug. 9, 1999

(86) PCT No.: PCT/GB99/02617
§ 371 (c)(1),
(2), (4) Date: Feb. 21, 2001

(87) PCT Pub. No.: WO00/10822
PCT Pub. Date: Mar. 2, 2000

(30) Foreign Application Priority Data

Aug. 22, 1998 (GB) .............................. 9818269

(51) Int. Cl.⁷ ............................................ B60G 21/067
(52) U.S. Cl. ................................ 280/5.506; 280/5.512; 280/5.511
(58) Field of Search ........................... 280/5.511, 5.512, 280/5.502, 5.506, 5.507, 5.508; 701/37, 38

(56) References Cited

U.S. PATENT DOCUMENTS

| | | | |
|---|---|---|---|
| 3,913,938 A | * 10/1975 | Aikawa et al. | .......... 280/6.158 |
| 4,605,244 A | 8/1986 | Tanaka et al. | |
| 4,624,477 A | 11/1986 | Kumagai et al. | |
| 4,634,143 A | 1/1987 | Asami et al. | |
| 5,440,488 A | * 8/1995 | Yamaoka et al. | ............. 701/37 |
| 6,139,120 A | * 10/2000 | Fukada | ........................ 180/197 |

FOREIGN PATENT DOCUMENTS

| | | |
|---|---|---|
| DE | 198 15 859 A | 10/1998 |
| EP | 0 431 646 A1 | 12/1990 |
| GB | 2 282 784 | 8/1994 |
| WO | WO 98/26948 | 6/1998 |

\* cited by examiner

*Primary Examiner*—Paul N. Dickson
*Assistant Examiner*—Faye M. Fleming
(74) *Attorney, Agent, or Firm*—Davis & Bujold, P.L.L.C.

(57) ABSTRACT

A vehicle suspension system control unit (40) is arranged to determine from a lateral accelerometer (42) and vehicle speed sensor (44) when the vehicle is executing a series of opposite turns in a slalom type manner which are likely to cause a build-up of body roll. In this situation the roll control system is modified from a regime in which some body roll is allowed, to a regime in which body roll is substantially prevented thereby to prevent the build up of body roll during slalom type maneuvers.

15 Claims, 3 Drawing Sheets

VEHICLE SUSPENSIONS

BACKGROUND

Under normal driving conditions it is generally desirable for the amount of body roll allowed by an active roll control system to be sufficient to signal to the driver when the vehicle is cornering hard. The system therefore needs to allow increasing body roll as the lateral acceleration increases. A system which does this is described in WO98/26948. However in some circumstances, in particular when the vehicle travels through a series of bends in a slalom type motion at a certain frequency at or near the resonant frequency of vibration of the vehicle about its roll axis, the magnitude of the roll vibrations can build up, the normal roll control characteristics being insufficient to prevent this.

SUMMARY OF THE INVENTION

U.S. Pat. No. 4,624,477 and U.S. Pat. No. 4,634,143 disclose semi-active damper systems in which the damping rate of a switchable damper is increased to reduce build up of body roll if slalom-type driving is detected.

Accordingly the present invention provides a suspension system for a vehicle the system comprising actuation means for applying forces between sprung and unsprung parts of a vehicle to control vehicle roll, lateral acceleration measuring means for providing a measure of the magnitude and an indication of the direction of lateral acceleration of the vehicle, and control means arranged to monitor said measure and to control the actuation means in a normal mode to provide an actuator force, dependent on said lateral acceleration, resisting vehicle roll, characterized in that the control means is further arranged, if the lateral acceleration changes direction a predetermined number of times, at a frequency which is within a predetermined frequency range, and the measure of lateral acceleration during each turn exceeds a predetermined level to enter a slalom mode in which it controls the actuation means to provide, for a particular lateral acceleration, more resistance to body roll than in the normal mode, at least over a range of lateral accelerations.

The lateral acceleration may be measured directly using a lateral accelerometer, or indirectly by measuring, for example, the steering angle of the steered wheels of the vehicle and the vehicle speed.

The actuation means may form part of an active roll-bar assembly and be arranged to apply a torque between the two ends of an anti-roll bar in order to control vehicle roll. Alternatively the actuation means may comprise a set of pneumatically or hydraulically actuated struts, one for each wheel of the vehicle, the struts being controlled to raise one side of the vehicle body and lower the other to control vehicle roll.

Preferably the control means is arranged in the slalom mode to control the actuation means so as substantially to prevent body roll up to the maximum force available from the actuation means.

Preferably the control means is arranged in normal operation to control the actuation means so as substantially to prevent body roll up to a predetermined level of lateral acceleration, and then to allow a controlled level of body roll for higher lateral accelerations.

Preferably, up to said predetermined level of acceleration, the anti-roll force produced by the actuators is the same in slalom mode as in normal operation, and the control means is arranged to change between normal operation and slalom mode only when the lateral acceleration is below said predetermined level.

BRIEF DESCRIPTION OF THE DRAWING

Preferred embodiments of the invention will now be described by way of example only with reference to the accompanying drawings in which.

DESCRIPTION OF THE PREFERRED EMBODIMENTS

Figure 1:
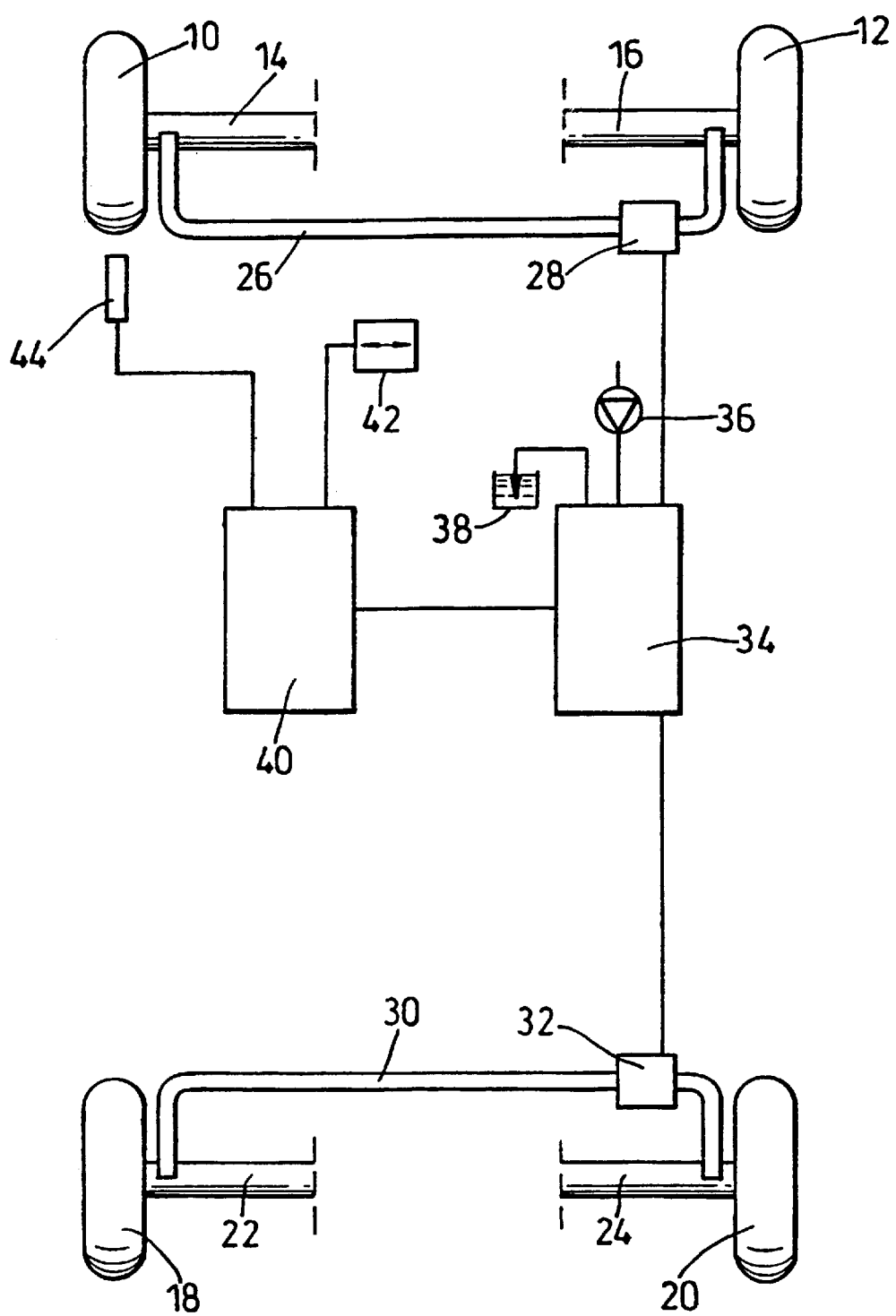
FIG. 1 is a diagrammatic representation of a vehicle including a suspension system according to the invention.

Referring to FIG. 1, a vehicle has two steerable front wheels 10, 12 mounted on suspension arms 14, 16 which are pivotably mounted on the vehicle body at their inner ends to allow vertical movement of the wheels 10, 12 relative to the vehicle body. Two non-steerable rear wheels 18, 20 are similarly mounted on corresponding suspension arms 22, 24 at the rear of the vehicle. The front suspension arms 14, 16 are interconnected by an anti-roll torsion bar 26 which resiliently opposes relative vertical movement of the two front wheels 10 ,12. The torsion bar 26 forms part of an assembly including a hydraulic actuator 28 which is only shown schematically and can be operated to apply a torque between the two ends of the torsion bar 26 thereby tending to move the two front wheels 10, 12 in opposite vertical directions relative to the vehicle body. The actuator can take a variety of forms which are known, such as a hydraulic strut acting between one end of the torsion bar and the body, or a torsional actuator in the central lateral part of the torsion bar applying a torque between the two ends, or a linear actuator arranged to rotate one end of the anti-roll bar relative to the main lateral part. A corresponding anti-roll bar 30 with an associated actuator 32 acts between the rear suspension arms 22, 24 to control articulation of the rear wheels 18, 20.

The actuators 28, 32 are controlled by a hydraulic control valve block 34 which can connect them up in known manner to a hydraulic pump 36 and reservoir 38 so as to apply torque in either direction independently to each anti-roll bar 26, 30.

The valve block 34 is controlled by an electronic control unit 40, which receives signals from a lateral accelerometer 42 mounted on the vehicle body which measures the acceleration of the vehicle body in the lateral direction, i.e. the horizontal direction perpendicular to the normal direction of travel, and vehicle wheel speed sensors 44, only one of which is shown, which measure the speed of rotation of each of the wheels 10, 12, 18, 20 and enable the control unit 40 to determine the speed of the vehicle.

Figure 2:
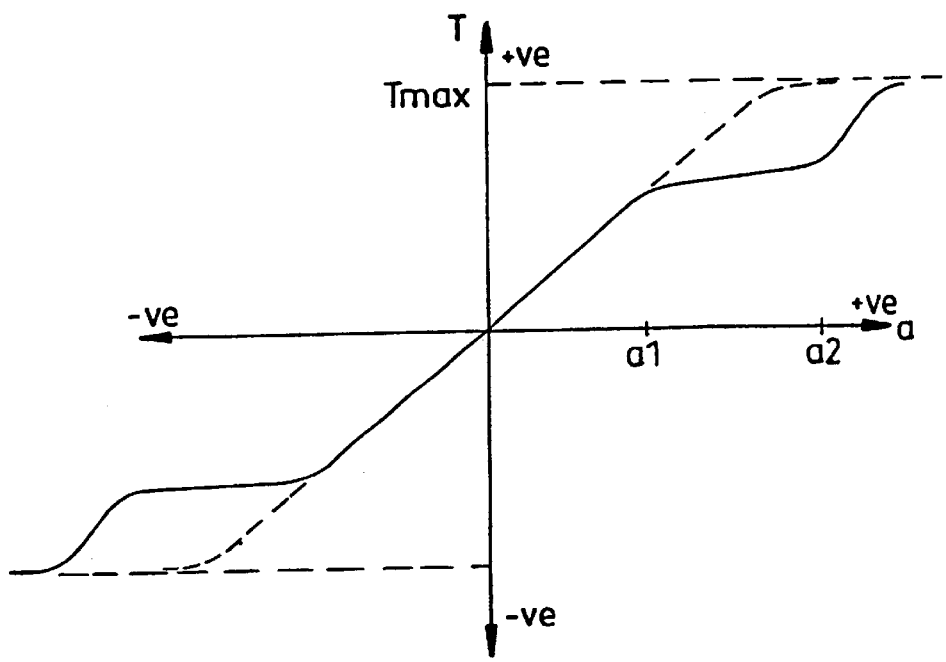
FIG. 2 is a characteristic showing actuator torque as a function of lateral acceleration in the vehicle of FIG. 1.

Under normal operation, the control unit 40 controls the valve block 34 so that the torque applied to each of the front and rear anti-roll bar actuators varies with lateral acceleration as shown in the solid line in FIG. 2. The actuating torque T in the actuators 28, 32 increases linearly with lateral acceleration a up to a magnitude of $a_1$. Within this range the torque T produced by the actuators is controlled so as to keep the vehicle body essentially level. At lateral accelerations greater than $a_1$ and up to $a_2$ the torque T increases less rapidly with lateral acceleration. This is so that, in this range of lateral acceleration, the vehicle body is allowed to roll to a limited extent so that the driver is aware of the cornering forces he is producing and is less likely to corner too hard. Finally, at lateral accelerations of magnitude greater than $a_2$ the torque T increases more rapidly again with increasing lateral acceleration towards the maximum torque $T_{max}$ available. The torque characteristic is symmetrical about the origin of the graph with lateral acceleration to the right as positive and to the left as negative, and the actuator torque which urges the right wheels down and the left wheels up (i.e. that which will be produced in response to a positive lateral acceleration) shown as positive, and actuator torque in the opposite sense shown as negative.

This normal torque characteristic, whilst designed for optimum control during normal driving, is less satisfactory if the vehicle is driven in a slalom type manner within a certain range of frequencies around the normal resonant frequency of the vehicle in roll motion about its roll axis. This is because, under these conditions, the steady rocking of the vehicle builds up and could ultimately lead to instability. Therefore the control unit 40 is arranged to detect slalom type driving conditions, in a manner which will be described below, and, in the event of those conditions prevailing, to convert its control of the actuators 28, 32 so as to follow the characteristic shown in broken lines in FIG. 2. Essentially, at lateral accelerations up to $a_1$ the actuator torque T varies with lateral acceleration as under normal control. However, at lateral accelerations higher than $a_1$ the torque T continues to increase at the same rate with lateral acceleration, up towards the maximum torque $T_{max}$ available. The effect of this is that, at higher lateral accelerations, rather than allowing an increasing amount of body roll, the actuators are controlled so as to keep the vehicle body essentially level until the lateral acceleration reaches such a level that the actuators can no longer do this.

The result of this modification of the roll control system under slalom type conditions is that the build up of body roll normally associated with such conditions is reduced.

In order to describe how the control unit 40 detects slalom type conditions, it is first necessary to describe the operation of the valve block 34 in slightly more detail. Essentially, the valve block has four states: 'locked' in which the actuators 28, 32 are locked and the roll bars 26 30 behave as conventional one-piece torsion bars; 'open' in which the two parts of each anti-roll bar 26, 30 are free to rotate relative to each other, 'left-assist' in which the actuators exert a torque on the anti-roll bar so as to cause the vehicle to roll towards the left, and 'right-assist' in which the actuators exert a torque on the anti-roll bar so as to cause the vehicle to roll towards the right. During normal on-road driving the system will enter 'left assist' or 'right assist' as soon as the lateral acceleration reaches a level where at least the minimum possible actuator torque is required to keep the vehicle level. There is therefore a deadband of very low lateral accelerations where no actuator torque is applied and the system is in 'open' mode. Such a system is described in more detail in our co-pending international patent application WO98/26948.

Figure 3:
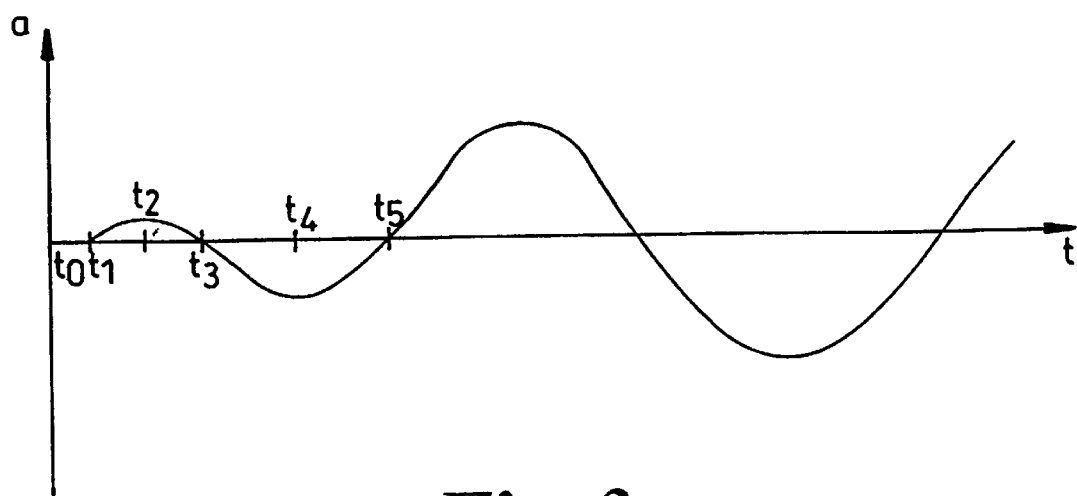
FIG. 3 is a graph showing changes of lateral acceleration measured by the vehicle of FIG. 1 is undergoing various manoeuvres.

Reference is now made to FIG. 3 in which the lateral acceleration as measured by the lateral accelerometer 42 varies with time during slaloming. At time $t_0$ the vehicle is travelling in a straight line and the lateral acceleration a is therefore zero. At time $t_1$ the driver starts to turn the steering wheel to the right to enter a turn. The steering angle is greatest at $t_2$ and returns to zero at $t_3$ when the turn is complete and the steeling wheel straight ahead again. However at $t_3$ the steering wheel is still being turned towards the left and the steering angle and lateral acceleration increase towards the left from then onwards, reaching a maximum at time $t_4$ and returning to zero again at time $t_5$. This pattern of oscillating lateral acceleration will continue as long as the vehicle continues to slalom.

The control unit 40 is arranged to monitor the operation of the valve block 34 and to measure the length, and determine the direction, of each turn by measuring the time between entering left-assist or right-assist mode at the beginning of successive turns. It also monitors the lateral acceleration during that turn, and the vehicle speed. If the time between the begining of one turn and the beginning of the next falls within a predetermined range of, say 0.5 to 2.0 seconds and magnitude of the lateral acceleration during the turn exceeds a predetermined value of, say, 0.4 g, and the vehicle speed on entering the turn exceeds a predetermined speed of, say, 20 kph, then the occurrence of this turn is recorded. If a sequence of three such turns in opposite directions is recorded in succession then the control unit determines that a slalom condition has been entered and the actuator torque control is switched to the slalom mode as described above. The slalom mode is then maintained until either a turn is completed which does not meet the slalom criteria described above, or a period of, say, 2.0s passes without a turn being completed. In either case the slalom mode is abandoned and the control unit 40 returns to normal operating mode. However, if the lateral acceleration is greater than al at that time, for example because the vehicle is cornering continuously in one direction for more than 2s at a greater lateral acceleration, the torque characteristic is not switched back until the lateral acceleration falls below that value so that the actuator torque does not change on the switch between the two torque characteristics.

Figure 4:
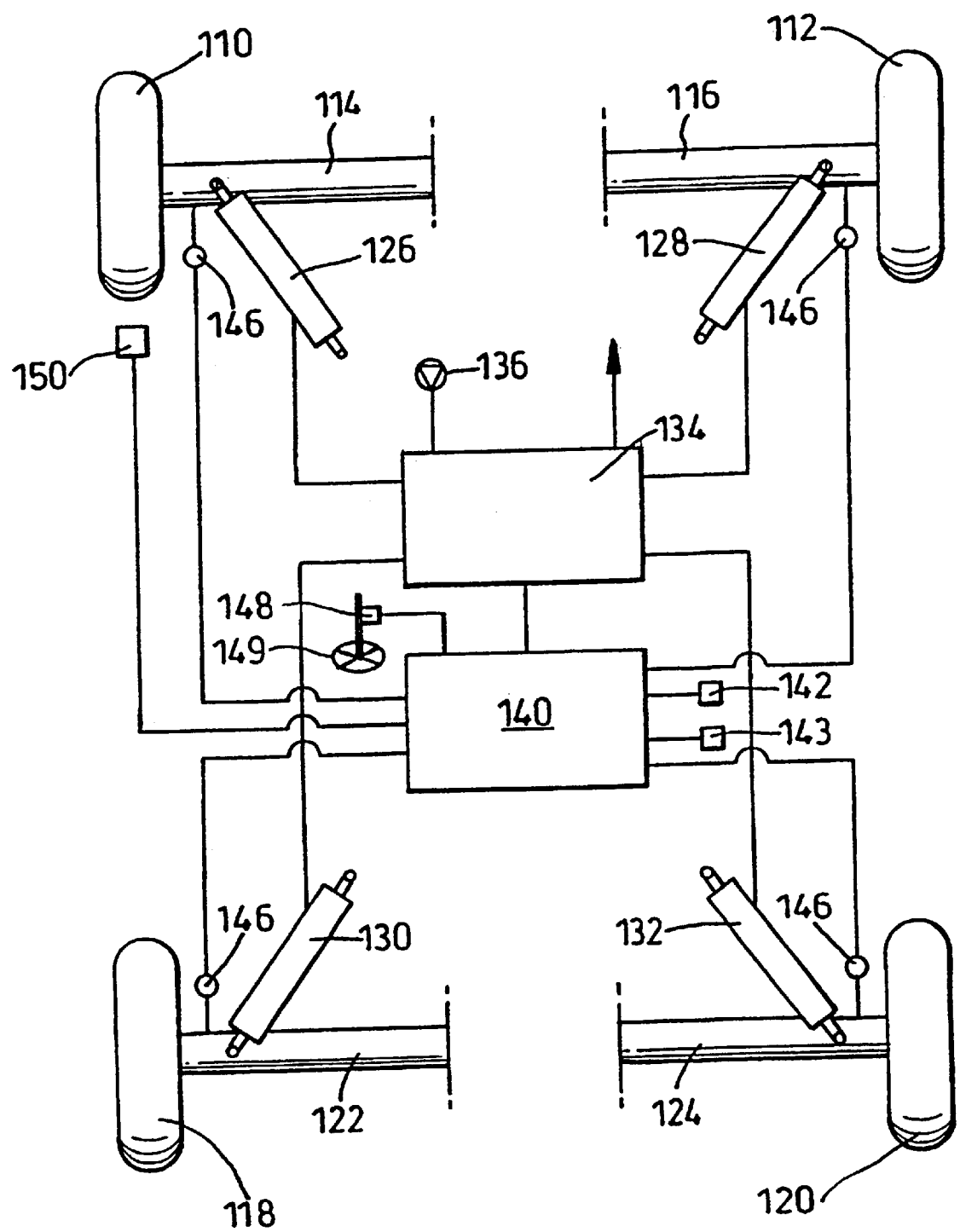
FIG. 4 is a diagrammatic representation of a vehicle including a suspension system according to a second embodiment of the invention.

Referring to FIG. 4, in a second embodiment of the invention a vehicle has a fully active independent air suspension, each of the two front wheels 110, 112 and the two rear wheels 118, 120 being mounted on a suspension arm 114, 116, 122, 124 which pivots about its inboard end. The vertical movement of each wheel is controlled by a gas strut 126, 128, 130, 132, the gas struts being connectable via a valve block 134 to a pneumatic pump 136 and to atmosphere. The valve block 134 is controlled by an electronic control unit 140 which controls the pneumatic pressure supplied to each of the gas struts 126, 128, 130, 132 in response to signals from various sensors. These comprise: a pair of lateral accelerometers 142, 144 which measure the lateral acceleration at different points of the vehicle body, height sensors 146 which measure the height of each of the wheels 110, 112, 118, 120 relative to the vehicle body, a steering angle sensor 148 for measuring the steering angle of the front wheels by measuring the angle of the steering wheel 149, and road speed sensors 150, only one of which is shown, which measure the road speed of each of the wheels 110, 112, 118, 120, and hence allow the control unit to determine the road speed of the vehicle.

The control unit 140 includes a map which determines what pressure is supplied to each of the gas struts 126, 128, 130, 132 in response to the full range of possible inputs from the sensors 142, 144, 146, 148, 150. This control includes the usual functions to control pitch and roll of the vehicle and to keep the vehicle level under various loads. However, according to the invention, as well as a normal map, it also includes a slalom map in which the resistance to body roll is increased with lateral acceleration so as to keep the vehicle body as level as possible up to the maximum force available from the actuators 126, 128, 130, 132. In this case the beginning and end of each turn is detected by monitoring the steering angle, and the measure of lateral acceleration is an integral of lateral acceleration over the duration of the turn obtained by integrating the product of the vehicle speed and the steering angle over the duration of the turn. Apart from this, the detection of the slalom condition is essentially the same as in the first embodiment.

What is claimed is:

1. A suspension system for a vehicle having sprung and unsprung parts, the system comprising actuation means for applying an actuator force between said sprung and unsprung parts to control vehicle roll, lateral acceleration measuring means for providing a measure of the magnitude and an indication of the direction of lateral acceleration of the vehicle, and a controller having defined therein a normal mode characteristic and a slalom mode characteristic each of which relates the actuator force to said measure, and being arranged to monitor said measure and to control the actuation means in a normal mode to provide an actuator force, which is dependent on said lateral acceleration according to said normal mode characteristic and resists vehicle roll, and, if the lateral acceleration undergoes a predetermined number of changes of direction, at a frequency which is within a predetermined frequency range, and the measure of lateral acceleration between successive changes of direction exceeds a predetermined level, to enter a slalom mode in which it controls the actuation means according to the slalom mode characteristic which provides, at least over a range of lateral accelerations, more resistance to body roll for each of said range of lateral accelerations than the normal mode characteristic.

2. The suspension system according to claim 1, wherein the lateral acceleration measuring means comprises an accelerometer for measuring said lateral acceleration directly.

3. The suspension system according to claim 1, wherein the lateral acceleration measuring means comprises steering angle measuring means and vehicle speed measuring means.

4. The suspension system according to claim 1 including an active anti-roll bar assembly which includes said actuator and an anti-roll bar having two ends, wherein the actuator is arranged to apply a variable torque between the two ends of the anti-roll bar in order to control vehicle roll.

5. The suspension system according to claim 1, wherein the actuation means comprises two struts, arranged on opposite sides of the vehicle, the struts being controlled to raise and lower the sides of the vehicle to control vehicle roll.

6. The suspension system according to claim 1, wherein the actuation means has a maximum available force and the controller is arranged in the slalom mode to control the actuation means up to the maximum available force so as substantially to prevent body roll.

7. The suspension system according to claim 1, wherein the controller is arranged in the normal mode to control the actuation means so as substantially to prevent vehicle roll up to a predetermined level of lateral acceleration, and then to allow a controlled level of body roll for higher lateral accelerations.

8. The suspension system according to claim 7, wherein up to said predetermined level of acceleration, the anti-roll force produced by the actuators is the same in slalom mode as the normal mode, and the controller is arranged to change between the normal mode and the slalom mode only when the lateral acceleration is below said predetermined level.

9. The vehicle including a suspension system according to claim 1.

10. The suspension system according to claim 1, wherein the controller is arranged to determine when the slalom mode should be entered by monitoring the time between successive turns and the lateral acceleration during said turns.

11. The suspension system according to claim 10, wherein the controller is arranged to monitor the time between said successive turns by monitoring the time between the beginning of said successive turns.

12. The suspension system according to claim 10, wherein the controller is arranged to monitor a speed at which the vehicle enters each of said successive turns, and only to enter the slalom mode of said speed exceeds a predetermined speed.

13. The suspension system according to claim 1, wherein the controller is arranged to control the actuation means, in the normal mode, so as to substantially prevent vehicle roll up to a predetermined level of lateral acceleration, and thereafter allow a controlled level of body roll over a range of higher level of acceleration and, once the lateral accelerations exceed the range of the higher level of acceleration, the controller once again controls the actuation means to substantially prevent vehicle roll.

14. A suspension system for a vehicle having sprung and unsprung parts, the system comprising at least one actuator for applying an actuator force between said sprung and unsprung parts to control vehicle roll, a lateral accelerometer for providing a measure of the magnitude and an indication of the direction of lateral acceleration of the vehicle, and a controller having defined therein a normal mode characteristic and a slalom mode characteristic each of which relates the actuator force to said measure, and being arranged to monitor said measure and to control said at least one actuator in a normal mode to provide an actuator force, which is dependent on said lateral acceleration according to the normal mode characteristic and resists vehicle roll, and, if the lateral acceleration undergoes a predetermined number of changes of direction, at a frequency which is within a predetermined frequency range, and the measure of lateral acceleration between successive changes of direction exceeds a predetermined level, to enter a slalom mode in which it controls said at least one actuator according to the slalom mode characteristic which provides, at least over a range of lateral accelerations, more resistance to body roll for each of said range of lateral accelerations than the normal mode characteristic.

15. The suspension system according to claim 14, wherein the controller is arranged to control the actuation means, in the normal mode, so as to substantially prevent vehicle roll up to a predetermined level of lateral acceleration, and thereafter allow a controlled level of body roll over a range of higher level of acceleration and, once the lateral accelerations exceed the range of the higher level of acceleration, the controller once again controls the actuation means to substantially prevent vehicle roll.

\* \* \* \* \*